May 3, 1932.  T. O. ANDERSON ET AL  1,857,092
TUFTING MACHINE
Filed March 19, 1929   6 Sheets-Sheet 4

INVENTOR.
T. O. Anderson,
BY J. R. Earp,
ATTORNEY.

May 3, 1932.  T. O. ANDERSON ET AL  1,857,092

TUFTING MACHINE

Filed March 19, 1929  6 Sheets-Sheet 6

INVENTOR.
T. O. Anderson,
BY J. R. Earp,
ATTORNEY.

Patented May 3, 1932

1,857,092

UNITED STATES PATENT OFFICE

TROY OTIS ANDERSON, OF EAST LAKE, AND JEHUE RUSSELL EARP, OF CHATTANOOGA, TENNESSEE

TUFTING MACHINE

Application filed March 19, 1929. Serial No. 348,241.

This invention relates to sewing machines and has special reference to a sewing machine for producing on a fabric a series of tufts, the machine being preferably termed a tufting machine.

One important object of the invention is to provide an improved general construction of tufting apparatus for use in connection with a sewing machine employing a reciprocating needle bar.

A second important object of the invention is to provide an improved rotary means, rotating continuously in one direction during the operation of the machine, for performing the operations of holding strand loops downwardly upon upward reciprocation of the needle bar, cutting such strand loops, and actuating gripping means or clamps for holding both sides of the loops during the cutting operation so that there is no tendency to draw the strand through the fabric in one direction or the other.

A third important object of the invention is to provide an improved arrangement of spring pressed clamp and release means therefor in such a machine.

A fourth important object of the invention is to provide improved means for positioning the loops between the jaws of the clamp.
A fifth important object of the invention is to provide, in such a machine, a novel form of knife and knife guide for severing the loops after the same are formed.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and.

In the machine as here disclosed there is shown an ordinary head having a base or work table 10 and arm 11. This arm carries the reciprocating needle bar 12 provided with means at its lower end to receive and secure a needle 13. The needle bar is reciprocated in the usual manner by a rock lever 14 and link 15 connected to a crank or eccentric formed on the drive shaft 16. At the top of the needle bar is a thread or strand tensioning device 17 and on the arm 11 is a second tensioning device 18 to which the strand 19 is led from a spool 20, the strand passing from the tensioning device 18 over the tensioning device 17 and down to the needle 13. On the shaft 16 is a cam 21 against which the head 22 of a plunger 23 is held by a spring 24. The outer end of this plunger is connected to one end of a lever 25 pivoted intermediate its ends to a post 26 and having its other end connected by a link 27 with a pusher bar 28 the use of which will be hereinafter explained. Also, on the shaft 16 is mounted an eccentric whereon is a strap 29 having a blade 30 connected by a link 31 with one end of a lever 32 pivoted intermediate its ends to the post 33. The other end of this lever is connected by an arm 34 with a plate 35 carrying a second plate 36 provided with spaced and serrated fabric feed bars 37, the two plates being adjustable in relative position by the screws 38 and screws 39 moving in slots 40 serve to guide the plates in adjustment.

Figure 27:
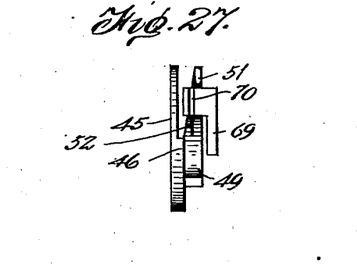
Figure 27 is a detail from the rear showing the parts for forming and severing the loop.

At the left hand end of the machine there is provided a second shaft 41 which is connected by a link 42 with a disk 43 fixed on the shaft 16, the link being pivoted to the disk and shaft 41. On the left hand end of the shaft 41 is a disk 44 having its periphery rabbeted to receive a ring 45 and extending arcuately around the face of this ring is a rib 46 having a dove-tail groove 47 therein. In this groove 47 fits an arcuate dove-tail rib 48 formed on a loop engaging finger 49 also of arcuate form, the finger being held in assembled position by means of suitable screws 50. The point 51 of this finger is free from the ring 45 and lies in spaced relation thereto as can be seen by reference to Figure 27. Fixed to project inwardly from the concave side of the finger is a knife 52, the use of which will be presently explained.

Figure 25:
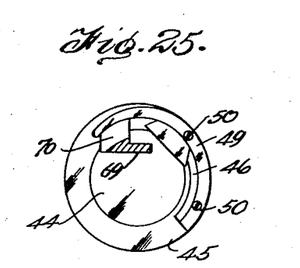
Figure 25 is a detail showing the relation of the knife and knife guide or guard.
Figure 26:
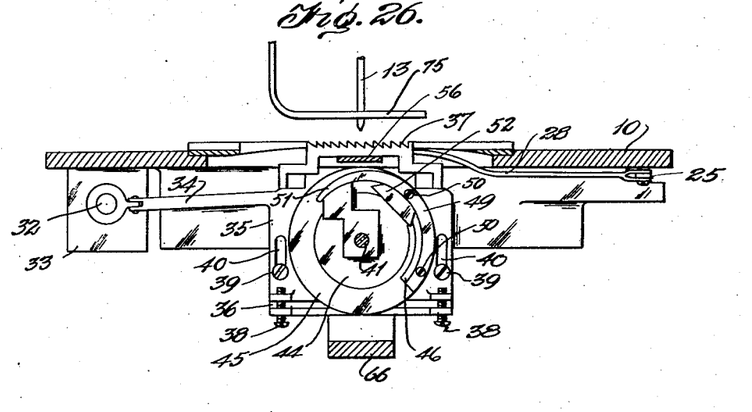
Figure 26 is a section on the line 26—26 of Figure 1 to an enlarged scale.

Supported beneath the work table is a bar 53 which has one end just to the right of the path of the needle to form a fixed jaw 54. Also this bar is provided with a rabbeted extension 55 wherein slides a bar 56 having an angled portion 57 extending rearwardly from its left end to form a movable jaw 58, a notch 59 being provided in this movable jaw to permit passage of the needle upon the jaws being closed together. The other end of the bar 56 is beveled as at 59' to engage a cam 60 mounted on the shaft 41. Supported from the table 10 is a bracket 61 wherethrough passes a plunger 62 which bears against the bar 56, being urged to force said bar into closed position by a spring 63 which may be adjusted for tension by a screw 64 Also this plunger is provided with a finger grip 65 for manual opening of the jaws when desired. Furthermore, there depends from the table an arm 66 which carries a bracket 67 adjustable by means of a screw 68 toward and from the knife and secured on this bracket is a knife guide member 69 having a slot 70 therein wherethrough the knife works as the shaft 41 revolves as shown in Figure 25. In connection with the table 10 there is provided the usual needle plate 71 slotted as at 72 to permit the passage of the feed teeth and having a needle slot 73 between the slots 72, a groove 74 leading rearwardly from the slot 73 so that the formed tufts may pass readily from the needle plate. The usual presser foot 75 is likewise provided with the machine.

Figure 1:
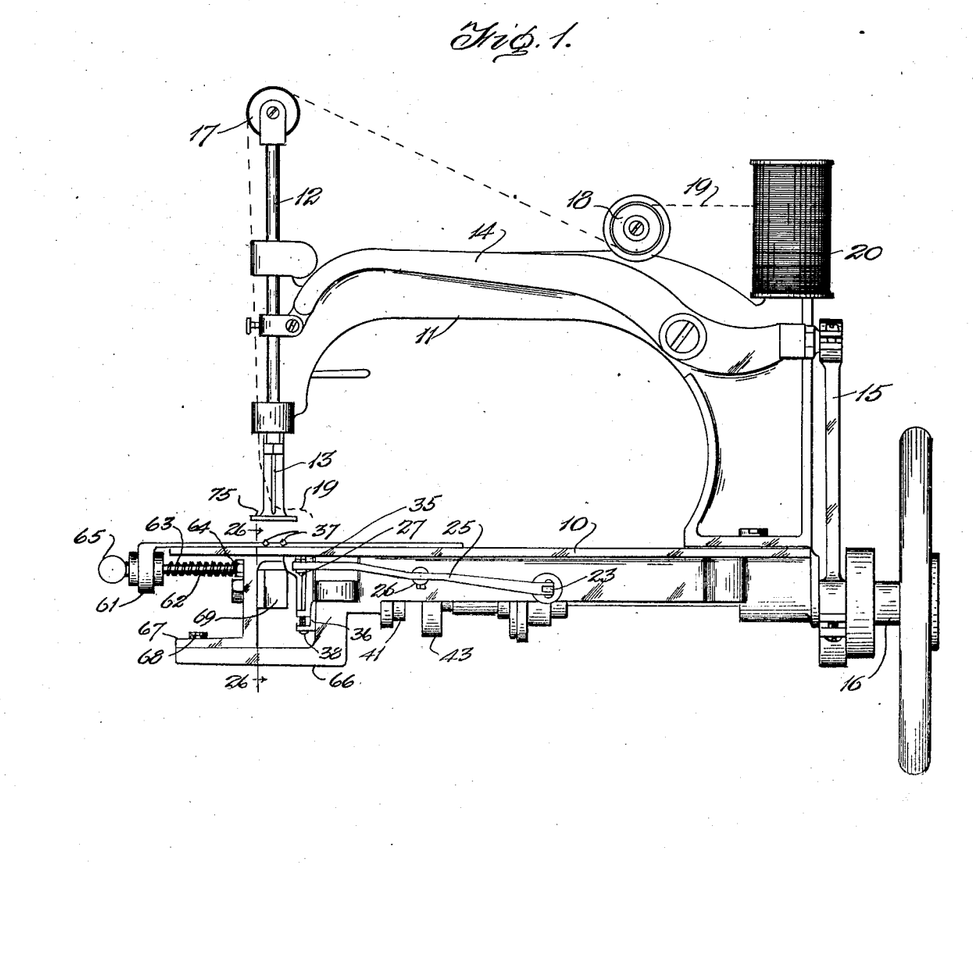
Figure 1 is a front elevation of a tufting machine head constructed in accordance with this invention.
Figure 2:
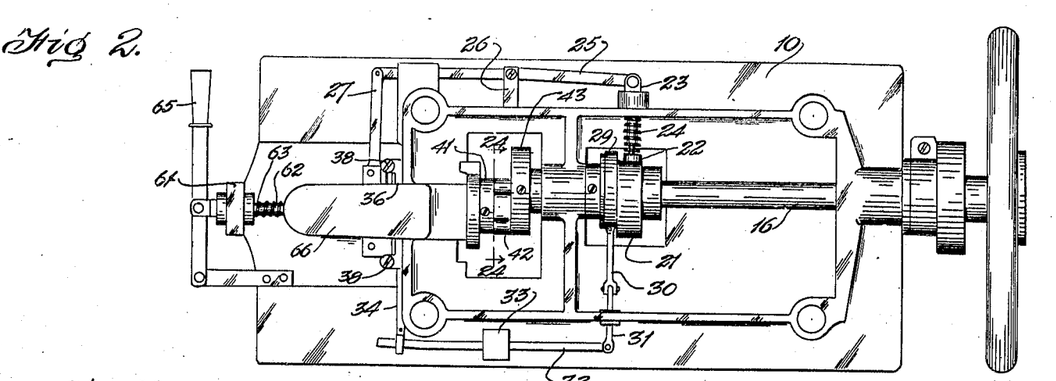
Figure 2 is a bottom plan view thereof showing the parts in one position.
Figure 3:
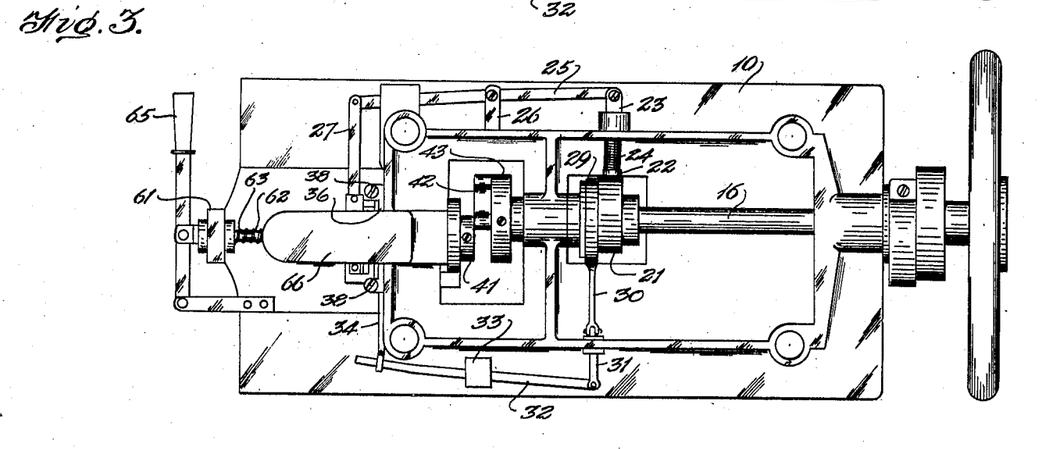
Figure 3 is a view similar to Figure 2 but showing the parts in a second position.
Figure 4:
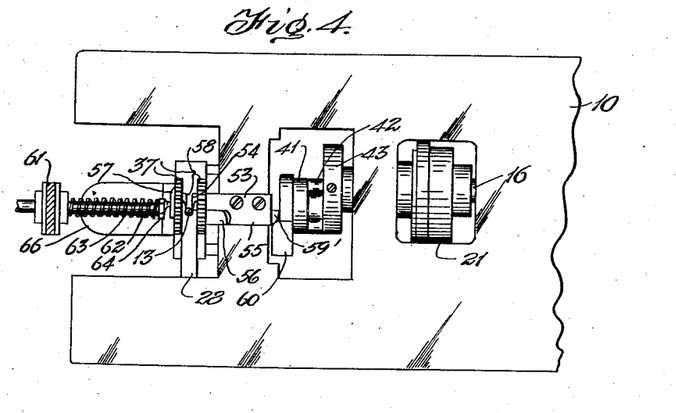
Figure 4 is a top plan view, partly in section, of the left hand end of Figure 1.
Figures 5, 6:
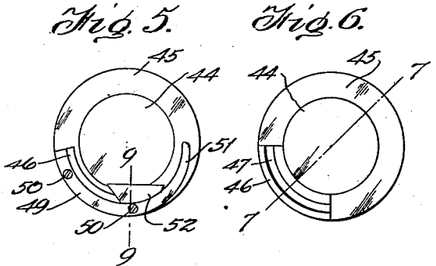
Figure 5 is a face view of the knife and knife ring assembled.
Figure 6 is a face view of the knife ring 55 with the knife and loop finger removed.
Figure 7:
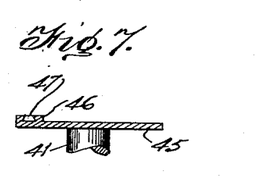
Figure 7 is a section on the line 7—7 of Figure 6.
Figures 8, 9, 10:
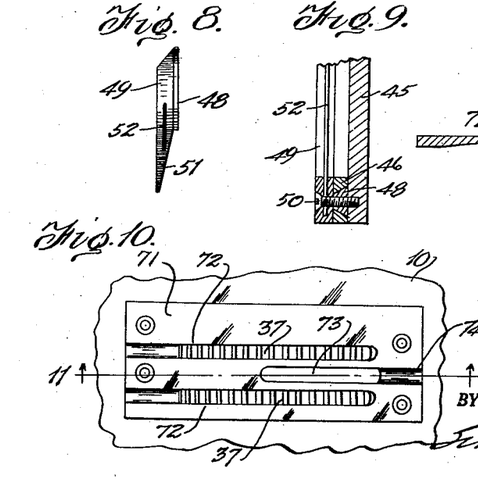
Figure 8 is a view from the concave side of the knife supporting finger, shown in Figure 5, the finger being removed.
Figure 9 is a section on the line 9—9 of Figure 5 to an enlarged scale.
Figure 10 is a plan view of the needle plate of the machine.
Figure 11:
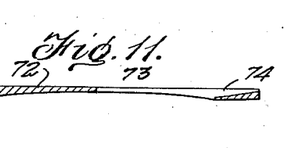
Figure 11 is a section on the line 11—11 of Figure 10.
Figure 12:
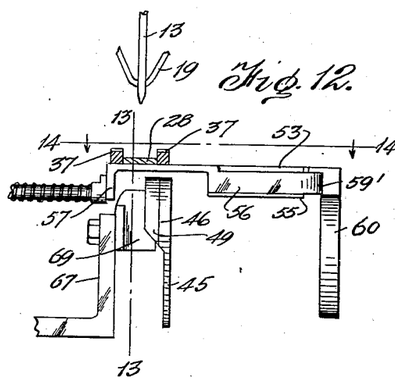
Figure 12 is a front elevation, partly in section, disclosing the loop holding, cutting and clamping means and the parts therewith as they appear at the start of the operation.
Figure 13:
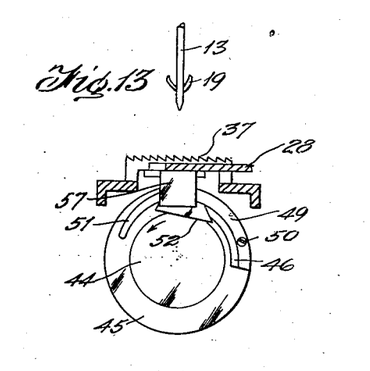
Figure 13 is a section on the line 13—13 of Figure 12.
Figure 14:
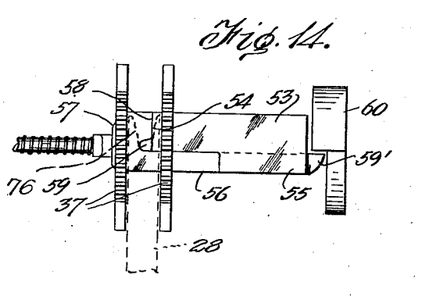
Figure 14 is a section on the line 14—14 of Figure 12.
Figure 15:
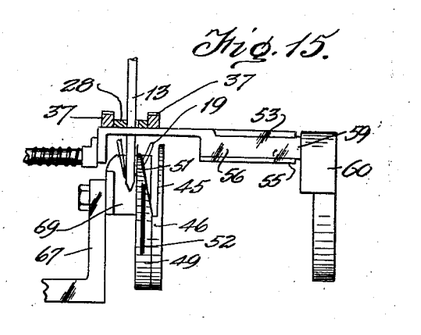
Figure 15 is a view similar to Figure 12 showing a second step in the operation.
Figure 16:
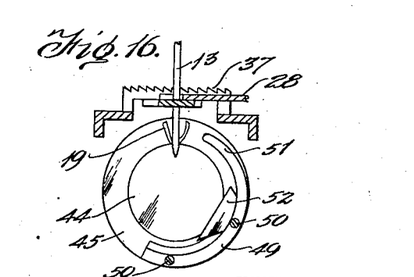
Figure 16 is a view similar to Figure 13 showing said second step.
Figure 17:
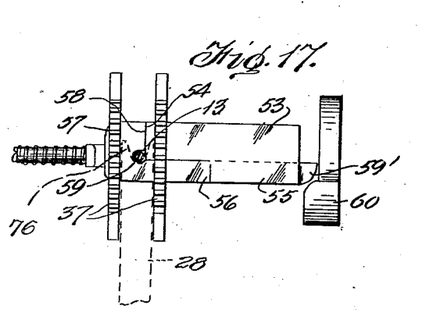
Figure 17 is a view similar to Figure 14 showing said second step.
Figure 18:
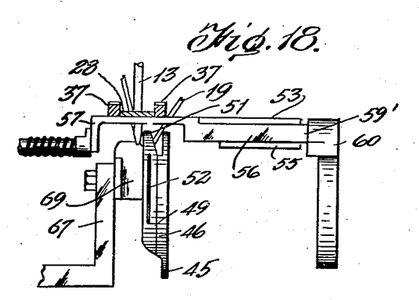
Figure 18 is a view similar to Figure 12 showing a third step in the operation.
Figure 19:
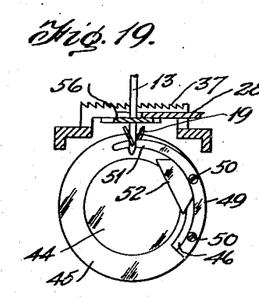
Figure 19 is a view similar to Figure 13 showing the third step. Figure 20:
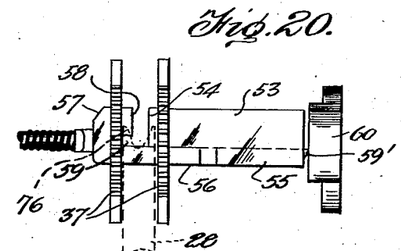
Figure 20 is a view similar to Figure 14 showing the third step.
Figure 21:
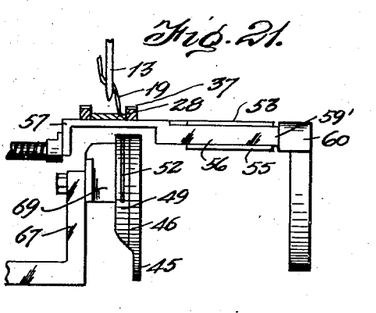
Figure 21 is a view similar to Figure 12 showing the fourth step in the operation.
Figure 22:
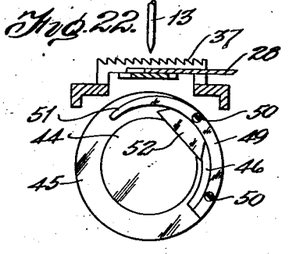
Figure 22 is a view similar to Figure 13 showing said fourth step.
Figure 23:
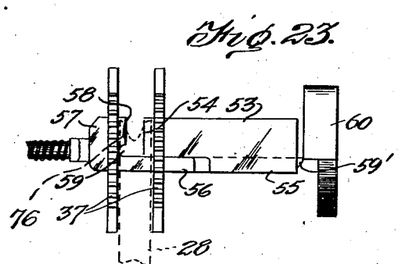
Figure 23 is a view similar to Figure 14 showing said fourth step.
Figure 24:
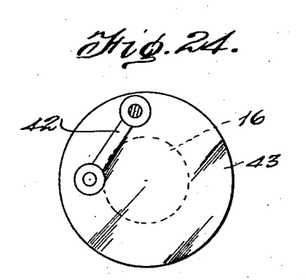
Figure 24 is a detail section on the line 24—24 of Figure 2.

Now, the operation of the device may be clearly understood from Figures 12 to 23 inclusive wherein it will be seen that at the start of the operation the needle is raised and the bar 28 is pushed rearwardly by the action of the cam 21. Also, it will be observed that in this position the point 51 of the finger lies to the rear of the line of movement of the needle as shown in Figure 13. Furthermore, it is to be noted from Figure 14 that the rear end of the bar 28 is forked as at 76. The needle now descends and during the descent of the needle the knife ring rotates to the position shown in Figure 16 while at the same time the cam 21 rotates to permit backward movement of the bar 28 so that this bar does not interfere with the descent of the needle. As shown in Figure 17 just at this time the high spot of the clamp operating cam 60 has reached the beveled end 59' of the bar carrying the movable jaw. A slight further movement in the direction of the arrow of the ring 45 brings the parts to such position that the movable jaw 58 is opened as in Figure 20, the point 51 engaging at this time between the needle and the strand so that as the needle retracts in its upward movement a loop is formed and held down as shown in Figures 18 and 19. Now, further movement upward of the needle is accompanied by movement to the rear of the bar 28 under the influence of the cam 21 which pushes the loop thus formed into the space between the jaws 54 and 58 and there holds it until the cam 60 has revolved slightly beyond the point shown in Figure 23 at which time the spring 63 closes the movable jaw 58 on the two sides of the loop, the loop having been pushed between the fixed and movable jaws by the action of the bar 28. This brings the parts to the positions shown in Figures 21, 22 and 23 whereupon further movement restores the parts to the original position shown in Figures 12, 13 and 14, the knife 52 following the finger through the loop and cutting the loop at its bottom point while both sides are firmly held by the clamp. At this time the feed operates to step the fabric rearwardly for the next downward movement of the needle. Repetition of this operation causes the formation of a series of tufts so that a complete line of tufts may be formed on the fabric.

It is to be observed that the knife, and its supporting finger, can readily be removed from the other parts for sharpening without requiring entire disassembling of the mechanism.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a tufting machine, the combination with a reciprocating needle and means for guiding a strand thereto, means for holding a fabric for penetration by the needle and a doubled portion of the strand forming a loop, a rotary knife positioned below the fabric holding means and arranged to pass through and sever each loop as formed, and a clamp arranged to grip both sides of the loop simultaneously during severing movement of the knife.

2. In a tufting machine, the combination with a reciprocating needle and means for guiding a strand thereto, means for holding a fabric for penetration by the needle and a doubled portion of the strand forming a loop, an arcuate finger below said fabric holding means, means for supporting said finger for rotation through the loop to hold the loop down upon upward reciprocation of the needle, and a knife projecting from the concave side of said finger and spaced from the forward end thereof.

3. In a tufting machine, the combination with a reciprocating needle and means for guiding a strand thereto, means for holding a fabric for penetration by the needle and a doubled portion of the strand forming a loop, an arcuate finger below said fabric holding means, means for supporting said finger for rotation through the loop to hold the loop down upon upward reciprocation of the needle, a knife projecting from the concave side of said finger and spaced from the forward end thereof, and a clamp below the fabric holding means and arranged to grip the loop upon engagement of said loop by the finger and before action of the knife on the loop.

4. In a tufting machine, the combination with a reciprocating needle and means for guiding a strand thereto, means for holding a fabric for penetration by the needle and a doubled portion of the strand forming a loop, a rotary knife positioned below the fabric holding means and arranged to pass through and sever each loop as formed, a clamp arranged to grip the loop during severing movement of the knife, and means to push the loop into the clamp upon opening movement of said clamp.

5. In a tufting machine, the combination with a reciprocating needle and means for guiding a strand thereto, means for holding a fabric for penetration by the needle and a doubled portion of the strand forming a loop, an arcuate finger below said fabric holding means, means for supporting said finger for rotation through the loop to hold the loop down upon upward reciprocation of the needle, a knife projecting from the concave side of said finger and spaced from the forward end thereof, a clamp below the fabric holding means and arranged to grip the loop upon engagement of said loop by the finger and before action of the knife on the loop, and means to push the loop into the clamp upon opening movement of said clamp.

6. In a tufting machine, the combination with a reciprocating needle and means for guiding a strand thereto, means for holding a fabric for penetration by the needle and a doubled portion of the strand forming a loop, a shaft revolving below the fabric holding means, a disk on said shaft adjacent the path of said needle, an arcuate finger concentric to the axis of the shaft mounted on the disk and having its free end positioned to enter the loop and hold it against upward movement upon upward reciprocation of said needle, and a knife on the concave side of said finger and spaced from the free end thereof.

7. In a tufting machine, the combination with a reciprocating needle and means for guiding a strand thereto, means for holding a fabric for penetration by the needle and a doubled portion of the strand forming a loop, a shaft revolving below the fabric holding means, a disk on said shaft adjacent the path of said needle, an arcuate finger concentric to the axis of the shaft mounted on the disk and having its free end positioned to enter the loop and hold it against upward movement upon upward reciprocation of said needle, a knife on the concave side of said finger and spaced from the free end thereof, and a clamp arranged to grip the loop during severing movement of the knife.

8. In a tufting machine, the combination with a reciprocating needle and means for guiding a strand thereto, means for holding a fabric for penetration by the needle and a doubled portion of the strand forming a loop, a shaft revolving below the fabric holding means, a disk on said shaft adjacent the path of said needle, an arcuate finger concentric to the axis of the shaft mounted on the disk and having its free end positioned to enter the loop and hold it against upward movement upon upward reciprocation of said needle, a knife on the concave side of said finger and spaced from the free end thereof, a clamp arranged to grip the loop during severing movement of the knife, and means to push the loop into the clamp upon opening movement of said clamp.

9. In a tufting machine, the combination with a reciprocating needle and means for guiding a strand thereto, means for holding a fabric for penetration by the needle and a doubled portion of the strand forming a loop, a shaft revolving below the fabric holding means, a disk on said shaft adjacent the path of said needle, an arcuate finger concentric to the axis of the shaft mounted on the disk and having its free end positioned to enter the loop and hold it against upward movement upon upward reciprocation of said needle, a knife on the concave side of said finger and spaced from the free end thereof, a clamp having a fixed jaw at one side of the loop and a reciprocable member forming a movable jaw at the other side thereof provided with a notch to permit reciprocation of the needle, a spring urging the movable jaw toward the fixed jaw, and a cam on said shaft engaging said reciprocable member to force the movable jaw open against the action of said spring.

10. In a tufting machine, the combination with a reciprocating needle and means for guiding a strand thereto, means for holding a fabric for penetration by the needle and a doubled portion of the strand forming a loop, a shaft revolving below the fabric holding means, a disk on said shaft adjacent the path of said needle, an arcuate finger concentric to the axis of the shaft mounted on the disk and having its free end positioned to enter the loop and hold it against upward movement upon upward reciprocation of said needle, a knife on the concave side of said finger and spaced from the free end thereof, a clamp having a fixed jaw at one side of the loop and a reciprocable member forming a movable jaw at the other side thereof provided with a notch to permit reciprocation of the needle, a spring urging the movable jaw toward the fixed jaw, a cam on said shaft engaging said reciprocable member to force the movable jaw open against the action of said spring, and means to push the loop into position between said jaws upon opening thereof.

11. In a tufting machine, the combination with a reciprocating needle and means for guiding a strand thereto, means for holding a fabric for penetration by the needle and a doubled portion of the strand forming a loop, a shaft revolving below the fabric holding means, a disk on said shaft adjacent the path of said needle, an arcuate finger concentric to the axis of the shaft mounted on the disk and having its free end positioned to enter the loop and hold it against upward movement upon upward reciprocation of said needle, a knife on the concave side of said finger and spaced from the free end thereof, a clamp having a fixed jaw at one side of the loop and a reciprocable member forming a movable jaw at the other side thereof provided with a notch to permit reciprocation of the needle, a spring urging the movable jaw toward the fixed jaw, a cam on said shaft engaging said reciprocable member to force the movable jaw open against the action of said spring, a push bar reciprocable transversely of said jaws and having a loop engaging end movable over and away from said jaws, and means to actuate the push bar in timed relation to the opening and closing of said jaws.

12. In a tufting machine, the combination with a reciprocating needle and means for guiding a strand thereto, means for holding a fabric for penetration by the needle and a doubled portion of the strand forming a loop, a shaft revolving below the fabric holding means, a disk on said shaft adjacent the path of said needle, an arcuate finger concentric to the axis of the shaft mounted on the disk and having its free end positioned to enter the loop and hold it against upward movement upon upward reciprocation of said needle, a knife on the concave side of said finger and spaced from the free end thereof, a clamp having a fixed jaw at one side of the loop and a reciprocable member forming a movable jaw at the other side thereof provided with a notch to permit reciprocation of the needle, a spring urging the movable jaw toward the fixed jaw, a cam on said shaft engaging said reciprocable member to force the movable jaw open against the action of said spring, a push bar reciprocable transversely of said jaws and having a loop engaging end movable over and away from said jaws, a driving shaft having operative connection with the first shaft, a cam on the driving shaft, and a linkage between said last mentioned cam and the push bar to operate the bar upon rotation of the shaft in timed relation to the opening and closing of said jaws.

13. In a tufting machine, the combination with a reciprocating needle and means for guiding a strand thereto, means for holding a fabric for penetration by the needle and a doubled portion of the strand forming a loop, a rotary knife positioned below the fabric holding means and arranged to pass through and sever each loop as formed, a clamp arranged to grip both sides of the loop simultaneously during severing movement of the knife, and a guide for said knife against which the loop rests during severing movement of the knife.

14. In a tufting machine, the combination with a reciprocating needle and means for guiding a strand thereto, means for holding a fabric for penetration by the needle and a doubled portion of the strand forming a loop, a rotary knife positioned below the fabric holding means and arranged to pass through and sever each loop as formed, a clamp arranged to grip the loop during severing movement of the knife, means to push the loop into the clamp upon opening movement of said clamp, and a guide for said knife against which the loop rests during severing movement of the knife.

15. In a tufting machine, a rotating loop cutter knife moving continuously in the same direction, means for forming a series of strand loops in the path of said knife, a guide fixed in the path of said knife and having a slit through which the knife passes during severing of the loops.

16. In a tufting machine, a rotating loop cutter knife moving continuously in the same direction through cutting and non-cutting positions alternately, a loop forming needle reciprocating in timed relation with the knife and arranged to form a strand loop upon each movement of the knife through non-cutting position, a guide fixed in the path of said knife and having a slit through which the knife passes during severing of the loops.

In testimony whereof we affix our signatures.

TROY OTIS ANDERSON.
JEHUE RUSSELL EARP.